United States Patent
Sill et al.

(10) Patent No.: US 9,510,171 B1
(45) Date of Patent: Nov. 29, 2016

(54) PROVISIONING MOBILE STATION WITH DESTINATION COMMUNICATION ADDRESS DURING DE-REGISTRATION

(75) Inventors: Tim W. Sill, Platte City, MO (US); Louie E. Wingo, Liberty, MO (US); Sanjay K. Sharma, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 579 days.

(21) Appl. No.: 13/427,357

(22) Filed: Mar. 22, 2012

(51) Int. Cl.
*H04M 11/04* (2006.01)
*H04W 4/22* (2009.01)

(52) U.S. Cl.
CPC ...................................... *H04W 4/22* (2013.01)

(58) Field of Classification Search
CPC ... H04W 76/007; H04W 4/22; H04W 64/00; H04W 4/02
USPC ............ 455/404.1, 404.2, 414.1, 417, 432.1, 455/445
See application file for complete search history.

(56) References Cited

U.S. PATENT DOCUMENTS

| | | | |
|---|---|---|---|
| 5,189,395 A | 2/1993 | Mitchell | |
| 5,276,440 A | 1/1994 | Jolissaint et al. | |
| 5,457,680 A | 10/1995 | Kamm et al. | |
| 5,649,301 A | 7/1997 | Yabusaki et al. | |
| 5,673,305 A | 9/1997 | Ross | |
| 5,731,757 A | 3/1998 | Layson, Jr. | |
| 5,732,347 A | 3/1998 | Bartle et al. | |
| 5,845,142 A | 12/1998 | Hayasaka | |
| 5,919,239 A | 7/1999 | Fraker et al. | |
| 6,014,080 A | 1/2000 | Layson, Jr. | |
| 6,219,540 B1 | 4/2001 | Besharat et al. | |
| 6,240,284 B1 * | 5/2001 | Bugnon | H04W 4/22 455/404.1 |
| 6,330,438 B1 | 12/2001 | McClelland et al. | |
| 6,349,206 B1 | 2/2002 | Reichelt et al. | |
| 6,427,001 B1 | 7/2002 | Contractor et al. | |
| 6,484,027 B1 | 11/2002 | Mauney et al. | |
| 6,493,629 B1 | 12/2002 | Van Bosch | |
| 6,545,448 B1 | 4/2003 | Stanley et al. | |
| 6,570,974 B1 | 5/2003 | Gerszberg et al. | |
| 6,606,556 B2 | 8/2003 | Curatolo et al. | |
| 6,639,516 B1 | 10/2003 | Copley | |
| 6,650,901 B1 | 11/2003 | Schuster et al. | |
| 6,665,611 B1 | 12/2003 | Oran et al. | |
| 6,674,368 B2 | 1/2004 | Hawkins et al. | |
| 6,678,357 B2 | 1/2004 | Stumer et al. | |

(Continued)

OTHER PUBLICATIONS

U.S. Appl. No. 10/935,884, filed Sep. 8, 2004.
(Continued)

*Primary Examiner* — Temica M Beamer

(57) ABSTRACT

A method, apparatus, and system for provisioning a mobile station with a destination communication address, such as a public safety answering point address for instance, during de-registration of the mobile station from a cellular radio access network (RAN). During de-registration of the mobile station from the cellular RAN, a location of the mobile station may be determined. The location may then be used as a basis to look up a communication address of a PSAP or other such destination, and the communication address may be provided to the mobile station in a de-registration response message, or the de-registration response message may be otherwise used as a basis to convey the communication address to the mobile station. Thereafter, when the mobile station seeks to place an emergency service call while not registered with the RAN, the mobile station may conveniently retrieve the communication address and place the call to that address.

20 Claims, 4 Drawing Sheets

(56) References Cited

U.S. PATENT DOCUMENTS

| | | |
|---|---|---|
| 6,718,263 B1 | 4/2004 | Glass et al. |
| 6,735,455 B2 | 5/2004 | Naito et al. |
| 6,744,859 B1 | 6/2004 | Koepke et al. |
| 6,771,742 B2 | 8/2004 | McCalmont et al. |
| 6,856,804 B1 | 2/2005 | Ciotta |
| 6,884,816 B2 | 4/2005 | May et al. |
| 6,898,438 B1 | 5/2005 | Uchida |
| 6,906,522 B2 | 6/2005 | Bertness et al. |
| 7,020,460 B1 | 3/2006 | Sherman et al. |
| 7,024,321 B1 | 4/2006 | Deninger et al. |
| 7,042,985 B1 | 5/2006 | Wright |
| 7,046,992 B2 | 5/2006 | Wallentin et al. |
| 7,098,855 B2 | 8/2006 | Kotzin et al. |
| 7,155,238 B2 | 12/2006 | Katz |
| 7,164,930 B2 | 1/2007 | Korneluk et al. |
| 7,245,900 B1 | 7/2007 | Lamb et al. |
| 7,409,219 B2 | 8/2008 | Levitan |
| 7,433,673 B1 | 10/2008 | Everson et al. |
| 7,602,886 B1 | 10/2009 | Beech et al. |
| 7,904,244 B2 | 3/2011 | Sugla |
| 2001/0026240 A1 | 10/2001 | Neher |
| 2002/0080759 A1 | 6/2002 | Harrington et al. |
| 2002/0187779 A1 | 12/2002 | Freeny, Jr. |
| 2002/0196147 A1 | 12/2002 | Lau |
| 2003/0036374 A1 | 2/2003 | English et al. |
| 2003/0109245 A1 | 6/2003 | McCalmont et al. |
| 2003/0134648 A1 | 7/2003 | Reed et al. |
| 2003/0148757 A1 | 8/2003 | Meer |
| 2003/0162548 A1 | 8/2003 | Kujala |
| 2003/0210671 A1 | 11/2003 | Eglin |
| 2003/0216144 A1 | 11/2003 | Roese et al. |
| 2004/0012519 A1 | 1/2004 | Durst et al. |
| 2004/0057425 A1 | 3/2004 | Brouwer et al. |
| 2004/0176040 A1 | 9/2004 | Thornton et al. |
| 2004/0184584 A1 | 9/2004 | McCalmont et al. |
| 2004/0190497 A1 | 9/2004 | Knox |
| 2004/0192271 A1 | 9/2004 | Eisner et al. |
| 2004/0196182 A1 | 10/2004 | Unnold |
| 2004/0198397 A1 | 10/2004 | Weiss |
| 2004/0220726 A1 | 11/2004 | Jin et al. |
| 2004/0225534 A1 | 11/2004 | Zheng |
| 2005/0009521 A1 | 1/2005 | Preece |
| 2005/0020241 A1 | 1/2005 | Holland et al. |
| 2005/0020242 A1 | 1/2005 | Holland et al. |
| 2005/0020280 A1 | 1/2005 | Holland et al. |
| 2005/0020281 A1 | 1/2005 | Holland et al. |
| 2005/0024269 A1 | 2/2005 | Kotzin et al. |
| 2005/0026589 A1 | 2/2005 | Holland et al. |
| 2005/0083911 A1 | 4/2005 | Grabelsky et al. |
| 2005/0096102 A1 | 5/2005 | Mock et al. |
| 2005/0111630 A1 | 5/2005 | Potorny et al. |
| 2005/0174991 A1 | 8/2005 | Keagy |
| 2005/0175166 A1 | 8/2005 | Welenson et al. |
| 2005/0213716 A1 | 9/2005 | Zhu et al. |
| 2006/0023747 A1 | 2/2006 | Koren et al. |
| 2006/0030290 A1 | 2/2006 | Rudolf et al. |
| 2006/0072547 A1 | 4/2006 | Florkey et al. |
| 2006/0084430 A1 | 4/2006 | Ng |
| 2006/0120517 A1 | 6/2006 | Moon et al. |
| 2006/0188073 A1 | 8/2006 | Wright |
| 2006/0193446 A1 | 8/2006 | Colunga |
| 2006/0281437 A1 | 12/2006 | Cook |
| 2007/0003024 A1 | 1/2007 | Olivier et al. |
| 2008/0001771 A1 | 1/2008 | Faoro et al. |
| 2008/0108330 A1 | 5/2008 | O'Neil et al. |
| 2010/0246780 A1* | 9/2010 | Bakker et al. .................. 379/38 |
| 2012/0100849 A1 | 4/2012 | Marsico |
| 2012/0142305 A1* | 6/2012 | Lane et al. ................. 455/404.1 |
| 2013/0028145 A1* | 1/2013 | Arora ............................ 370/259 |
| 2015/0081903 A1 | 3/2015 | Molinero Fernandez et al. |

OTHER PUBLICATIONS

M. Patrick, "DHCP Relay Agent Information Option," Network Working Group, Request for Comments: 3046, Jan. 2001.

H. Schulzrinne, Dyanmic Host Configuration Protocol (DHCP-for-IPv4) Option for Session Initiation Protocol (SIP) Servers, Network Working Group, Request for Comments: 3361, Aug. 2002.

H. Schulzrinne and B. Volz, Dynamic Host Configuration Protocol (DHCPv6) Options for Session Initiation Protocol (SIP) Servers, Network Working Group, Request for Comments: 3319, Jul. 2003.

H. Schulzrinne, "Emergency Services URI for the Session Initiation Protocol," Network Working Group, Internet-Draft, Feb. 8, 2004.

J. Polk, et al., "Dynamic Host configuration Protocol Option for Coordinate-based Location Configuration Information," Network Working Group, Request for Comments: 3825, Jul. 2004.

H. Schulzrinne and B. Rosen, "Emergency Services for Internet Telephony Systems," Network Working Group, Internet-Draft, Oct. 18, 2004.

H. Schulzrinne and R. Marshall, "Requirements for Emergency Context Resolution with Internet Technologies," ECRIT Requirements, Internet-Draft, May 5, 2005.

Schulzrinne, "Emergency Call Services for SIP-based Internet Telephony," Internet Engineering Task Force, Internet Draft, Mar. 25, 2001.

Schulzrinne, "Providing Emergency Call Services for SIP-based Internet Telephony," Internet Engineering Task Force, Internet Draft, Jul. 13, 2000.

Avaya Inc., "Comments on IP Telephony Support for Emergency Calling Service," TIA TR-41.4, TR41.4.1/01-08-002, Jul. 25, 2001.

Nortel Networks, "IP Telephony Support for Emergency Calling Service," TIA TR-41, TR41.4.1/01-08-001, Aug. 22, 2001.

Intrado, Inc., "VoIP Emergency Calling Services," 2003.

E. Griffith, "Wi-Fi Powers Metro Positioning System," Wi-Fi Planet News, Jun. 20, 2005.

Cisco Systems, Inc., "Cisco Emergency Responder Version 1.2(2)," Data Sheet, Sep. 2004.

D. Jackson, "Nortel proposes VoIP 911 solution," Mobile Radio Technology, May 1, 2004.

"How VOIP E911 might work," Vonage™ VoIP Forum—Vonage News, Reviews and Discussion, Mar. 2005.

G. Petrey, "NG 911 Project," Texas A&M University, Internet2 Technology Evaluation Center, Mar. 29, 2005.

B. Templeton, "DHCP Option for street address, PSAP for VoIP E911," Brad Ideas, May 2, 2005.

Proxim Corporation, "Wi-Fi in the Enterprise: Applications, Environments, Requirement and Solutions," Position Paper, 2004 (no month listed).

M. Tariq, et al., "Mobility Aware Server Selection for Mobile Streaming Multimedia Content Distribution Networks," Proc. 8th Int. workshop on Web Content Caching and Distribution, 2003 (no month listed).

J. Pulver, "pulver.com comments on the FCC issued E911 report," Nov. 4, 2002.

J. Pulver, "pulver.com comments on the Hatfield E911 Report," Oct. 30, 2002.

Intel Corporation, "Virtual LANs, Flexible network segmentation for high-speed LANs," Intel Network Information Series, 1997 (no month listed).

D. Passmore and J. Freeman, "The Virtual LAN Technology Report," decisys, May 1996.

First Action Interview Pilot Program Pre-Interview Communication from U.S. Appl. No. 14/033,951, dated Jun. 23, 2015.

* cited by examiner

PROVISIONING MOBILE STATION WITH DESTINATION COMMUNICATION ADDRESS DURING DE-REGISTRATION

BACKGROUND

The ability to place an emergency services call by dialing 9-1-1 has become widespread throughout the United States. When a 9-1-1 call is placed, it is typically answered at a public safety answering point (PSAP). However, there are many PSAPs throughout the United States, each serving a particular area, such as a city, county, or metropolitan area. The public switched telephone network (PSTN) can route a 9-1-1 call to the appropriate PSAP, i.e., the PSAP that serves the caller's area, because the caller's telephone number is associated with a fixed location.

Increasingly, however, packet networks are being used for voice or video communications, including emergency services calls. Such voice-over-packet or video-over-packet (both VoP) networks often route calls that are placed by client devices that can change their point of connectivity to the VoP network. For example, a mobile station may be able to place calls over the VoP network from different access points at different locations. In many cases, the access points are wireless access points that wirelessly communicate with mobile stations using an IEEE 802.11x or other wireless local area network (WLAN) protocol. Because of this mobility, mobile stations and their associated telephone numbers may not be reliably associated with fixed geographic locations. Even so, it is desirable for a mobile station user to be able to dial 9-1-1 from any location and have the call routed through the VoP network to the appropriate PSAP, i.e., the PSAP that serves the user's current location.

Accordingly, it would be desirable to provide methods and systems that facilitate VoP emergency service calls to appropriate PSAPs.

OVERVIEW

Disclosed herein is a method, and corresponding apparatus and system, that can help facilitate placement of emergency service calls to appropriate PSAPs or placement of other types of calls to appropriate destinations. The method is particularly useful in a scenario where a mobile station is registered for service with a cellular radio access network (RAN) and is de-registering from the RAN, and where the mobile station may place such a call after being de-registered from the RAN and thus when the mobile station is not registered with the RAN. For instance, the method could be applied in a scenario where the mobile station is handing off from being served by the RAN to being served by a WLAN and is thus de-registering from the RAN, and where the mobile station may then be able to place an emergency service call via the WLAN. Alternatively, the method could be applied in a scenario where the mobile station is simply de-registering from the RAN and may for one reason or another thereafter place an emergency service call via a WLAN rather than the RAN.

In one respect, disclosed is a method that involves receiving into the RAN wirelessly from a mobile station registered with the RAN a de-registration message seeking to de-register the mobile station from the RAN, and sending from the RAN wirelessly to the mobile station, in response to the de-registration message, a communication address that the mobile station can contact while the mobile station is not registered with the RAN. Optimally, the communication address may be a communication address of a PSAP that corresponds with the mobile station's current location. Thus, once the mobile station has de-registered from the RAN and is not being served by the RAN, the mobile station may place an emergency service call to the provided communication address, via a WLAN for instance.

In another respect, disclosed is a system including a RAN that has a base station arranged to engage in wireless communication with a mobile station, and particularly to wirelessly receive a de-registration message seeking to de-register the mobile station from the RAN and to wirelessly send to the mobile station, in response to the de-registration message, a de-registration response message. Further, the system includes a processing unit that is arranged to determine a communication address that the mobile station can contact when the mobile station has de-registered from the RAN and is thus not registered with the RAN. And the base station is arranged to use the de-registration response message to communicate to the mobile station the determined communication address so that the mobile station can contact the communication address after the mobile station has de-registered from the RAN and is thus not registered with the RAN. For instance, the base station may include the communication address in the de-registration response message, or may include in the de-registration response message a directive for the mobile station to retrieve the communication address from a particular network address.

In yet another respect, disclosed is a mobile station that includes a first wireless communication interface arranged to engage in wireless communication with a RAN, and a second wireless communication interface arranged to engage in wireless communication with a WLAN, and further includes data storage and a user interface. When the mobile station is registered for service with the RAN and seeks to de-register from the RAN, the mobile station uses the first wireless communication interface to transmit to the RAN a de-registration message and to receive from the RAN, in response to the de-registration message, a de-registration response message that contains a communication address of a PSAP. The mobile station then obtains the communication address from the de-registration response message and stores the address in the data storage for later reference. In turn, when the mobile station is not registered with the RAN and seeks to place a PSAP call as a result of input received at the user-interface, the mobile station retrieves the stored communication address from the data storage and uses the second wireless communication interface to place a call via the WLAN to the retrieved communication address.

These as well as other aspects, advantages, and alternatives will become apparent to those of ordinary skill in the art by reading the following detailed description, with reference where appropriate to the accompanying drawings. Further, it should be understood that the description provided by this document, including this overview section, is provided merely by way of example and without limitation.

DETAILED DESCRIPTION

Figure 1:
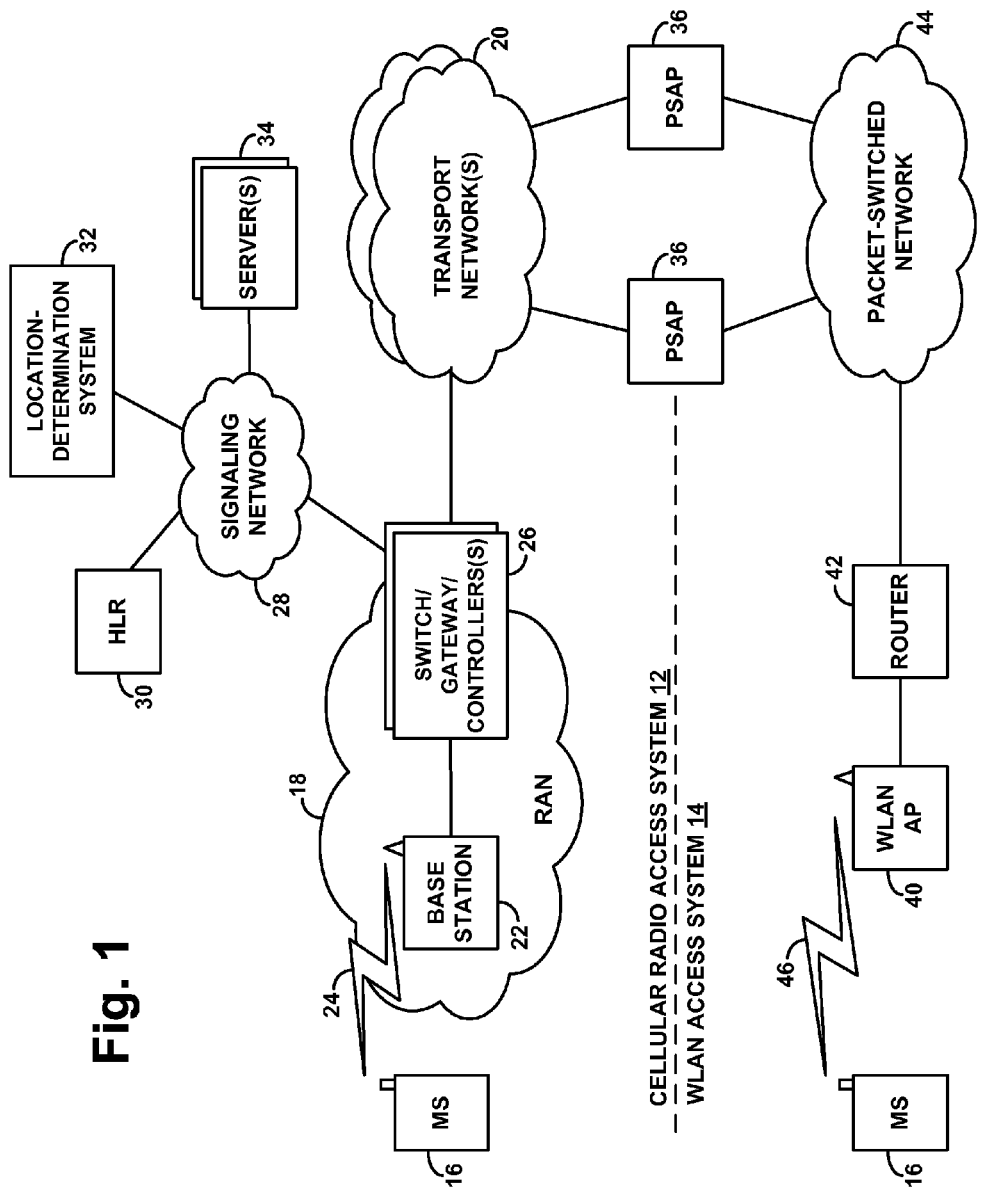
FIG. 1 is a simplified block diagram of an example network arrangement in which the present method can be implemented.

Referring to the drawings, as noted above, FIG. 1 is a simplified block diagram of an example network arrangement in which the present method can be implemented. In particular, the arrangement includes a representative cellular radio access system 12 and a representative WLAN access system 14, both arranged to serve a representative mobile station 16. In practice, the representative mobile station may be served by both systems concurrently or may be served by one system at a time, depending on the configuration and capabilities of the systems and the mobile station for instance.

It should be understood, however, that this and other arrangements described herein are provided as example only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

As shown in FIG. 1, the cellular radio access system 12 includes a RAN 18 that is arranged to provide mobile stations, such as mobile station 16, with access to one or more transport networks 20, such as the PSTN or the Internet for instance. In particular, RAN 18 is shown including a cellular base station 22 (e.g., base transceiver station, access node, eNodeB or the like), which would typically include an antenna configuration and associated equipment for radiating to define one or more coverage areas in which the mobile station 16 can wirelessly communicate with the base station 22 over an air interface 24. Base station 22 may operate according to a defined air interface protocol, such as CDMA, LTE, WiMAX, GSM, or any other protocol now known or later developed (including for instance various WLAN protocols). Further, mobile station 16 may be arranged to operate according to the same air interface protocol, so that the mobile station can communicate with the base station and gain access to transport network(s) 20 via the RAN 18.

Cellular radio access system 12 further includes various entities 26 such as switches, gateways, and controllers that may facilitate providing connectivity with transport network(s) 20 and may further help to control aspects of RAN operation, such as registration and de-registration of mobile stations for instance. Depending on the implementation, these entities 26 may be considered to be part of the RAN 18 or may instead be considered to be part of supporting network infrastructure such as a core network of a cellular carrier for instance.

By way of example, system 12 may include a mobile switching center (MSC), a soft-switch, a media gateway controller (MGC), a packet data serving node (PDSN), a serving gateway (S-GW), a packet data network gateway (P-GW), and a mobility management entity (MME) for instance, which may function to provide connectivity between base station 22 and transport network(s) 20. Further, these entities may be coupled with a signaling network 28 to facilitate communication with other system entities such as a home location register (HLR) (e.g., home subscriber server (HSS)) 30, a location-determination system 32, and other servers 34.

HLR 30 may function to store service profile records for mobile stations that subscribe to be served by cellular radio access system 12, such as for mobile station 16 for instance. For each such mobile station, the service profile record may indicate services that a RAN is to provide for the mobile station, such as abbreviated dialing, call forwarding, and the like. Further, the HLR may keep track of what portion of the cellular radio access system is serving the mobile station at any given time, so as to facilitate routing calls or other communications to the mobile station. For instance, the HLR may maintain for each mobile station a record of the base station, switch, gateway or other node currently serving the mobile station, or last known to be serving the mobile station. When an entity seeks to route a communication to the mobile station, the entity may thus query the HLR to determine the node currently serving the mobile station and may then route the communication to that node for routing in turn to the mobile station.

In practice, when mobile station 16 enters into coverage of RAN 18, such as coverage of base station 22 for instance, the mobile station may engage in a registration (e.g., attach) procedure so as to then be able to exchange user data to the extent the mobile station's service profile and capabilities allow, such to place and receive calls and engage in wireless packet-data communication for instance.

For example, upon detecting a pilot signal (e.g., a reference signal) broadcast by the base station, and perhaps in response to other conditions being met, the mobile station may transmit to the base station on an air interface uplink channel a radio access registration request (e.g., attach request) message. Upon receiving that registration request message, the base station may then signal to one or more other entities of the system 12, such as an MSC or MME for instance, which may in turn signal to the HLR 30. Through or in response to this signaling, the mobile station may be authenticated and its service subscription verified, the HLR may receive an update indicating where in the network the mobile station is located. Further, the HLR may provide the base station, MSC, MME, or the like with a copy of the mobile station's service profile for local storage and use to facilitate serving the mobile station, and one or more entities may work to set up a bearer communication channel for the mobile station. In turn, the base station may then transmit to the mobile station over an air interface downlink channel a registration response (e.g., attached accept) message, acknowledging the registration.

Once registered with the RAN 18, the mobile station may engage in bearer data communications in accordance with the mobile station's service profile and capabilities. For instance, the mobile station may place and receive calls and engage in wireless packet-data communication.

Likewise, when the mobile station is finished being served by the RAN 18, the mobile station may engage in a de-registration (e.g., detach) procedure to formally discontinue the service and thus to end the mobile station's registration with and access to the RAN. This de-registration procedure may occur for various reasons and in various situations. For example, the de-registration procedure may occur when the mobile station is being powered down at user request or in response to low battery power. As another example, the de-registration procedure may occur when the mobile station is leaving coverage of the RAN and/or if the mobile station is transitioning from being served by the RAN to being served by the WLAN access system 14 or by another access system.

In practice, the de-registration procedure may involve the mobile station transmitting to the base station on an air interface uplink channel a radio access de-registration request (e.g., detach request) message. Upon receiving that de-registration request message, the base station may then signal to one or more other entities of the system 12, such as an MSC or MME for instance, which may in turn signal to the HLR 30 and may tear down any bearer channels that had been assigned to the mobile station. Through this process, the HLR may update its records to indicate that the mobile station is no longer registered with and being served by the RAN. Further, the base station may transmit to the mobile station over an air interface downlink channel a de-registration response (e.g., detach accept) message, acknowledging the de-registration.

Once de-registered from the RAN, the mobile station may be unable to engage in bearer communication via the RAN unless and until the mobile station engages in the registration procedure again. (In practice, there may be exceptions to this rule. For instance, the mobile station may be able to place emergency service calls via the RAN without first engaging in the full registration procedure.)

Continuing with reference to FIG. 1, location-determination system 32 may including one or more servers and may function to facilitate determination and reporting of the geographic locations of mobile stations such as mobile station 16. In practice, the location-determination system may carry out this location determination with varying levels of granularity, depending on the circumstances and other factors.

For example, the location-determination system 32 may engage in signaling with the HLR, the MSC, the base station, or the mobile station itself, to determine the identity of the base station currently serving the mobile station. By reference to data that specifies known locations of base stations or centroids of base station coverage areas, the system 32 may then approximate the mobile station's location as the location of the serving base station or base station coverage area. As another example, through signaling with such entities, the location-determination system may obtain reports of signal-delay measurements for signals that the mobile station has received from various nearby base stations. By reference to data specifying locations of those base stations and considering the associated distances of those signals, the system 32 may then triangulate to estimate the location of the mobile station.

As still another example, the location-determination system 32 may provide the mobile station with satellite ephemeris data specifying global positioning system (GPS) satellites that may be in the sky over an estimated location of the mobile station, and may then receive from the mobile station information about satellite signals that the mobile station received from those satellites. The system 32 may then use that satellite signal information, also with triangulation for instance, to more accurately determine the mobile station's location. And as yet another example, the system 32 may communicate with the mobile station to receive from the mobile station a specification of the mobile station's location, as determined by the mobile station through reception and evaluation of GPS satellite signals.

In the arrangement of FIG. 1, additional server(s) 34 may take any of a variety of forms and may assist with carrying out various functions described herein. As shown, the server(s) 34 may sit be accessible on signaling network 28, so that one or more other entities connected with that network may communicate with the server. For instance, an MSC, MME, HLR, location-determination system or other entity may signal to the server(s) to cause the servers to carry out various functions. Alternatively, the server(s) may be positioned to intermediate on signaling passing between various entities. For example, a server may be positioned as an intermediary in the signaling path between an MSC or MME and the signaling HLR, and may be arranged to intermediate on registration and/or de-registration signaling passing between those entities.

As further shown in FIG. 1, transport network(s) may provide connectivity with a number of PSAPs 36, as examples of call destinations. As indicated above, a given PSAP may be in place to serve particular caller areas. In the context of cellular radio access system 12, for instance, the PSAP that is located geographically most closely to base station 22 may be designated to receive emergency service calls placed by mobile stations served by that base station. Although not shown, each PSAP may be part of a larger emergency service network (ESN), which may include gateways, routers and the like to facilitate connecting emergency service calls to the PSAP, for handling by an emergency service operator for instance.

Depending on network design and capabilities, an emergency service call may be set up to a PSAP as a circuit-switched telephone call and/or a VoP call.

For example, each PSAP or associated network entity may have a corresponding telephone number, compliant with the E.164 numbering convention, typically a 10-digit directory number. When a call is placed to 9-1-1 and is to be connected with a given PSAP, the cellular radio access system may map the call to the telephone number of that PSAP and may then engage in signaling to set up the call to that telephone number in much the same way that conventional telephone calls are connected.

Further, each PSAP or associated network entity may have a corresponding VoP contact address, such as a Session Initiation Protocol (SIP) address, which may correlate directly with an Internet Protocol (IP) address of the PSAP or perhaps with an E.164 telephone number of the PSAP. In some cases, for instance, a SIP address could be a derivation of an E.164 telephone number. For example, the telephone number 913-555-1212 might translate directly to the SIP address 9135551212@sprvoip.com. Thus, a call placed to the E.164 number could be translated to a VoP call placed to the corresponding SIP address, and vice versa.

When a call is placed to 9-1-1 and is to be connected with a given PSAP, the calling device and/or an entity acting on its behalf may map the call to the SIP address of that PSAP and may then send a SIP INVITE designating the SIP address and thus seeking setup of the call to that SIP address. Based on the designated SIP address, such a SIP INVITE may then be routed to the PSAP or associated entity, which may then respond with a SIP 200 OK. Typically after the calling device or other entity sends a SIP ACK, a VoP communication may thus be established, possibly using the Real-time Transport Protocol (RTP), and the call may proceed between the calling device and a PSAP operator.

In practice, cellular radio access system 12 may be provisioned with data that designates which PSAP corresponds with which of various base stations or other cellular serving areas in the system. For instance, an MSC may be provisioned with such data for each of various base stations that it serves, and/or one or more other entities of the system may include or have access to such data. Thus, when a mobile station places a 9-1-1 call via base station 22, system 12 may refer to that data to determine which PSAP is in place to receive emergency service calls placed through base station 22 and may connect the call to that PSAP, using one of the connection procedures discussed above for instance.

Turning now to the lower portion of FIG. 1, an example WLAN access system 14 is illustrated. As shown, the WLAN access system 14 includes a WLAN access point 40 and router 42 that are arranged to provide mobile stations, such as mobile station 16, with access to a packet-switched network 44 such as the Internet for instance (or for that matter with access to other types of transport networks). (Although networks 20 and 44 are shown separately in the figure, they may be one and the same.) Access point 40 would typically include an antenna configuration and associated equipment for radiating to define one or more WLAN coverage areas in which the mobile station 16 can wirelessly communicate with the access point 40 over an air interface 46. Further, the access point or the router may include Dynamic Host Control Protocol (DHCP) logic to facilitate assigning the mobile station an IP address for use to communicate on network 44.

WLAN access point 40 may operate according to a defined air interface protocol, such as an IEEE 802.11x protocol, a Bluetooth protocol, or other protocol now known or later developed (including for instance various cellular protocols such as those noted above). Further, mobile station 16 may be arranged to operate according to the same air interface protocol, so that the mobile station can communicate with the access point 40 and gain access to packet-switched network 44 via the access point 40.

In practice, for instance, upon detecting an SSID or the like broadcast by the access point 40, the mobile station 16 may engage in an association procedure to establish connectivity with the access point. Further, the access point or router may assign an IP address for the mobile station. At that point, depending on the mobile station's capabilities, the mobile station may then engage in bearer communication on the packet-switched network.

In the event the mobile station is equipped to engage in VoP calling, the mobile station may be able to place and receive VoP calls through its packet-switched connection. For instance, in the arrangement shown in FIG. 1, the mobile station may be able to place emergency service calls via the packet-switched network 44 to either of the PSAPs 36. For instance, when a user of the mobile station dials 9-1-1, the mobile station may use SIP signaling as described above to place a VoP to a PSAP, so as to allow the user to talk with a PSAP operator.

As noted above, however, an issue for the mobile station in this scenario is which PSAP the mobile station should call, and perhaps further what communication address (e.g., which SIP address or telephone number) the mobile station should call to reach the appropriate (e.g., nearest) PSAP.

The present method helps to address this issue by dynamically providing the mobile station with the communication address of an appropriate PSAP (or other such destination), or with information on where to obtain such an address, when the mobile station de-registers from the cellular RAN 18. In particular, when the mobile station sends a de-registration message to the RAN 18 and receives a de-registration response message from the RAN, the mobile station may receive in or with the de-registration response message a specification of the communication address, and the mobile station may store that address in data storage for later reference. Thereafter, when the mobile station seeks to place an emergency service call (or the like), the mobile station may retrieve the communication address from data storage and place the call to that address. For instance, when the mobile station is being served by a WLAN and a user dials 9-1-1, the mobile station may retrieve the communication address that the mobile station received during or as a result of de-registration from the cellular RAN, and the mobile station may place the call to that address.

To facilitate this in practice, one or more entities in the cellular radio access system 12 may include or have access to data that maps various locations with PSAPs, and particularly with PSAP communication addresses. During the process of de-registering the mobile station from the RAN, one or more such entities may then determine the location of the mobile station and refer to that data to determine the corresponding PSAP communication address. The RAN may then include that determined PSAP communication address in the de-registration response message that the RAN sends to the mobile station. Alternatively, the RAN may store the determined PSAP communication address at a defined network address and provide to the mobile station in the de-registration response message a directive for the mobile station to retrieve the PSAP communication address from that network address. The mobile station may then receive and store the PSAP communication address for later use in placing an emergency service call.

Optimally, the one or more entities in the cellular radio access system 12 that determine the mobile station's location, map the location to a PSAP communication address, and provide the PSAP communication address for inclusion in a de-registration response message to the mobile station would be involved with the de-registration procedure in some manner. For instance, some or all of these functions could be carried out by the base station 22, entities 26, HLR 30, or servers 34.

Figure 2:
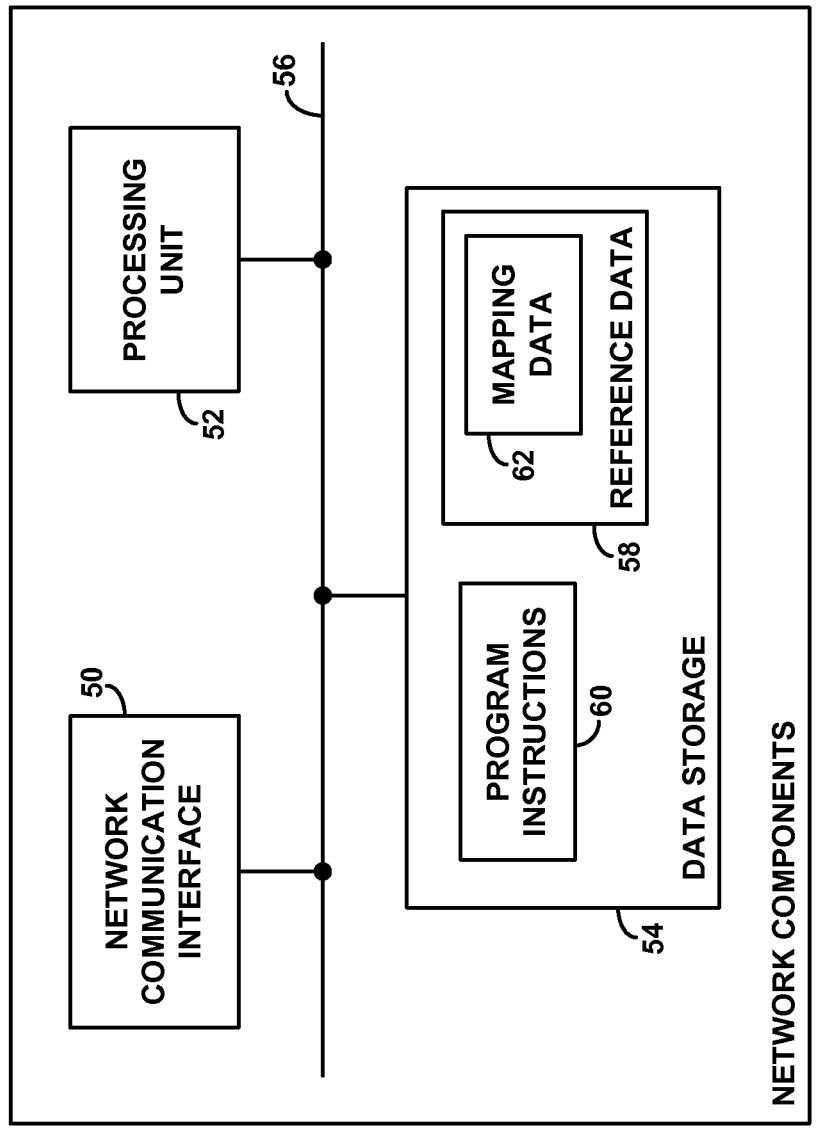
FIG. 2 is a simplified block diagram showing components of one or more network entities that may carry out aspects of the method.

FIG. 2 is a simplified block diagram showing functional components that could be included in one or more such entities to facilitate carrying out these functions in practice. As shown in FIG. 2, the components include a network communication interface 50, a processing unit 52, and data storage 54, all of which can be communicatively linked together by a system bus, network, or other connection mechanism 56.

Network communication interface 50 functions to facilitate communication with various other entities of the system. As such, the interface may include a wired or wireless Ethernet module or other interface, depending on the manner in which communication will occur.

Processing unit 52 may then comprise one or more general purpose processors (e.g., INTEL microprocessors) and/or one or more special purpose processors (e.g., application specific integrated circuits or digital signal processors). Further, data storage 54 may comprise one or more volatile and/or non-volatile storage components (non-transitory), such as magnetic, optical, flash, or organic storage components. As shown, data storage 54 may contain reference data 58 and program instructions 60.

Reference data 58 may comprise address mapping data 62 as described above, to correlate PSAP communication addresses (or other communication addresses) with geographic locations served by the PSAPs. For instance, the address mapping data 62 may specify ranges of geographic locations (e.g., latitude/longitude coordinates) and correlate each range with a particular PSAP communication address. Alternatively, the address mapping data 62 may correlate particular base station identifiers or other RAN wireless coverage area identifiers with particular PSAP communication addresses. Other arrangements are possible as well. By reference to the address mapping data, given the location of a mobile station it may thus be possible to readily determine the PSAP communication address that should be used for a call from that location or approximately from that location.

Program instructions 60 may then comprise machine language instructions or the like that are executable by the processing unit 52 to carry out various functions described herein.

Figure 3:
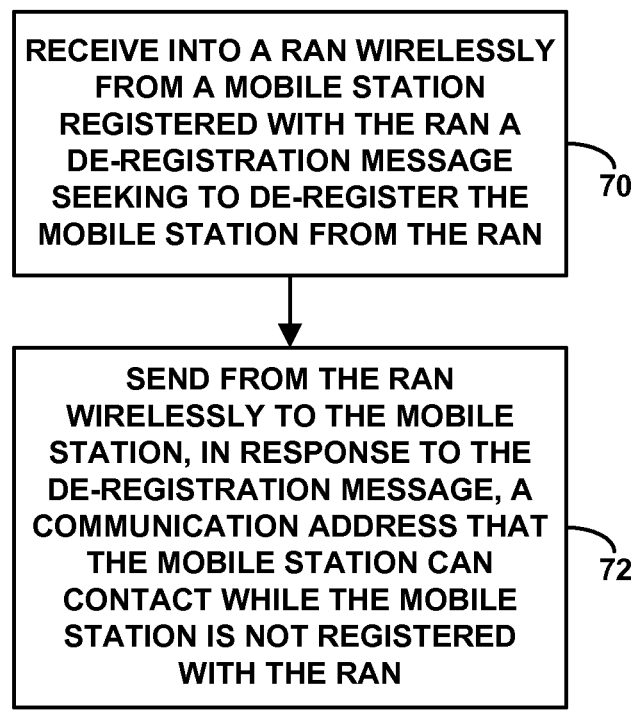
FIG. 3 is a flow chart depicting functions that can be carried out in accordance with the method.

FIG. 3 is a flow chart depicting such functions. As shown in FIG. 3, at block 70, the functions include receiving into a RAN wirelessly from a mobile station registered with the RAN a de-registration message seeking to de-register the mobile station from the RAN. And at block 72, the functions then include sending from the RAN wirelessly to the mobile station, in response to the de-registration message, a communication address that the mobile station can contact while the mobile station is not registered with the RAN.

In line with the discussion above, the communication address that the RAN provides to the mobile station in response to the de-registration message from the mobile station may be a PSAP communication address. Further, the address may be a telephone number (e.g., an E.164 telephone number) or a VoP address (e.g., a SIP address). As such, the communication address is not merely an address of the RAN or other address that might be provided as a source address of the de-registration response message.

To facilitate providing an appropriate communication address to the mobile station in this process, the function of block 72 may include the processing unit 52 determining a location of the mobile station and using that determined location as a basis to select the communication address to send to the mobile statin in response to the de-registration message. The location of the mobile station could be a geographic location of the mobile station itself, a geographic location of a base station or base station coverage area serving the mobile station while the mobile station is registered with the RAN, or some other representative indication of the location of the mobile station.

As such, processing unit could determine the location of the mobile station by requesting and receiving the location from the location-determination system 32, with the location-determination system 32 determining the location using any of the processes described above for instance. Alternatively, the mobile station could include in its de-registration message an indication of its own location (e.g., a GPS-determined location, or a location of the mobile station's serving base station broadcast by the base station, or the like), and the processing unit could determine the location of the mobile station by reading the indication of location from the de-registration message.

The base station may then be arranged to use the de-registration response message to communicate to the mobile station the determined communication address so that the mobile station can contact the communication address after the mobile station has de-registered from the RAN and is thus not registered with the RAN. For instance, the base station may transmit the communication address to the mobile station within the de-registration response message or accompanying the de-registration response message, or may transmit with the de-registration message an indication of where the mobile station may later obtain the communication address (as with a WAP push type message), and the mobile station may obtain the communication address accordingly.

Once the mobile station receives the communication address sent wirelessly from the RAN to the mobile station in response to the de-registration message, the mobile station may conveniently store the communication address for later reference. That way, when the mobile station later seeks to place an emergency service call, the mobile station may conveniently retrieve the communication address from data storage and place the call to that communication address.

In general, the mobile station 16 involved in this method may be any device that is arranged to engage in wireless communications, especially one that is equipped to engage in both cellular wireless communication via cellular radio access system 12 and WLAN communication via WLAN access system 14. Examples of such devices include cell phones, wirelessly equipped computers (e.g., notebook computers, tablet computers, etc.), gaming devices, embedded wireless modules, machine-to-machine modules, tracking modules, and other devices now known or later developed. While such a device would likely be mobile, the term "mobile station" does not necessarily mean that the device is readily movable. The device could be fixed in position.

Figure 4:
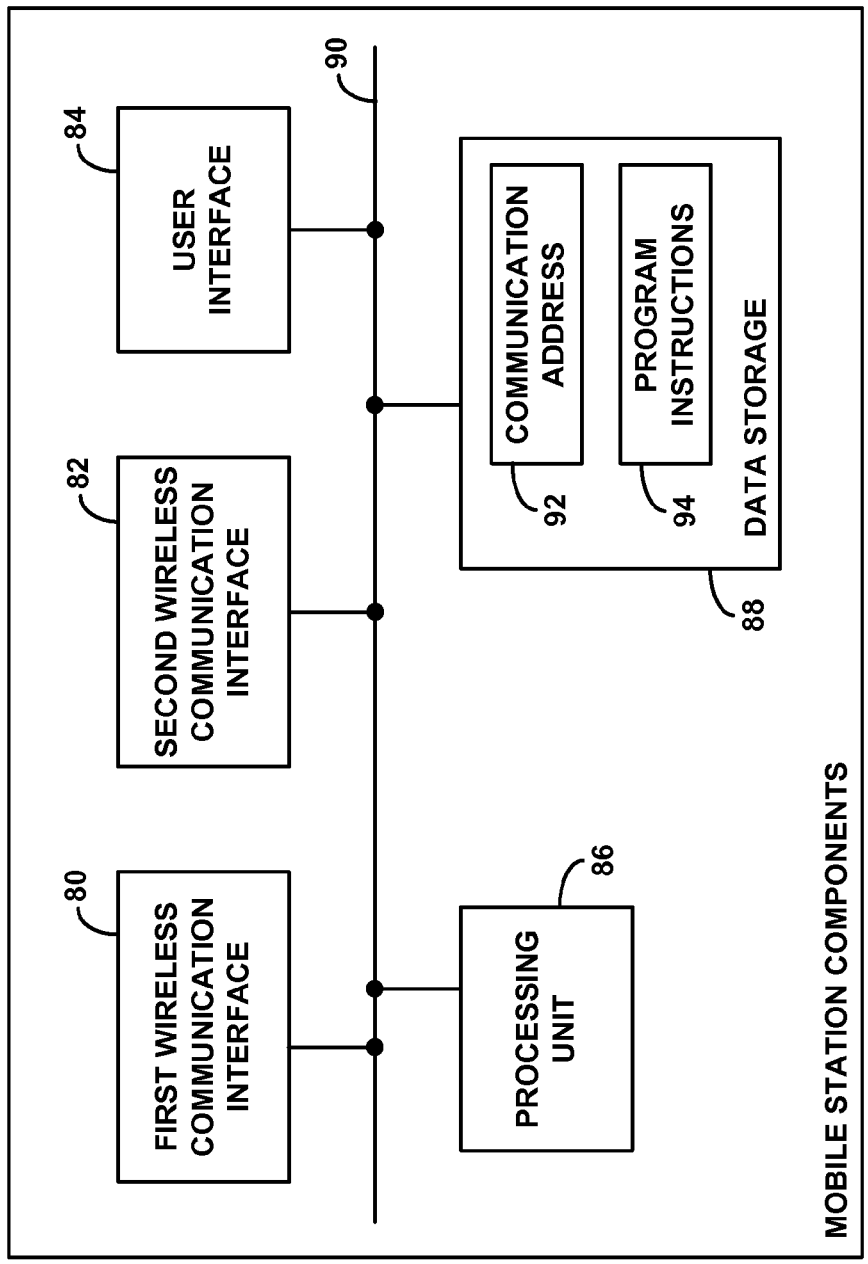
FIG. 4 is a simplified block diagram showing components of a mobile station that may carry out aspects of the method.

FIG. 4 is a simplified block diagram showing example components of such a mobile station. As shown, the mobile station includes a first wireless communication interface 80, a second wireless communication interface 82, a user interface 84, a processing unit 86, and data storage 88, all of which may be communicatively linked together by a system bus or other connection mechanism 90.

First wireless communication interface 80 may be arranged to engage in wireless communication with base station 22 according to an agreed air interface protocol such as one of those noted above. Similarly, second wireless communication interface 82 may be arranged to engage in wireless communication with WLAN access point 40 according to an agreed air interface protocol such as one of those noted above. In practice, these two wireless communication interfaces could be provided in the mobile station as separate chipsets or other components, or could be integrated together on a single chipset or the like.

User interface 84 facilitates interaction with a user of the mobile station, such as to receive a user request to place a 9-1-1 call or the like, and to enable exchange of bearer communications such as voice and video communications for instance. As such, the user interface may include input components such as a keypad, a touch-screen, a microphone, and a camera, and the user interface may include output components such as a display screen, a loud speaker, and a headset interface.

Processing unit 86 may in turn may comprise one or more general purpose processors (e.g., INTEL microprocessors) and/or one or more special purpose processors (e.g., application specific integrated circuits or digital signal processors) and may be integrated in whole or in part with either or both wireless communication interfaces 80, 82 and/or with other aspects of the mobile station.

And data storage 88 may comprises one or more volatile and/or non-volatile storage components, such as magnetic, optical, or organic storage and may be integrated in whole or in part with processing unit 86. As shown, data storage 88 is arranged to hold a communication address 92 that the mobile station receives during or as a result of de-registration from RAN 18, for later use in placing a call as discussed above. Further, data storage 88 holds program instructions 94 that are executable by the processing unit 86 to carry out various mobile station functions described herein.

By way of example, when the mobile station is registered with the RAN and seeks to de-register from the RAN, the processing unit 86 may generate for transmission to the RAN by the first wireless communication interface a de-registration message, and may receive from the RAN via the first communication interface, in response to the de-registration message, a de-registration response message. In line with the discussion above, the de-registration response message may contain a communication address of an applicable PSAP. The processing unit 86 may thus obtain the communication address from the de-registration response message and store the obtained communication address in the data storage 88 for later reference.

Further, when the mobile station is then not registered with the RAN and seeks to place a PSAP call as a result of input received at the user-interface (such as user dialing or speed-dialing 9-1-1), the processing unit may retrieve the stored communication address from the data storage and use the second wireless communication interface to place a call via the WLAN access point 44 to the retrieved communication address. For instance, the communication address may be structured as a SIP address, and the processing unit may generate and send via the second wireless communication interface a SIP INVITE seeking setup of a call to that SIP address.

Exemplary embodiments have been described above. Those skilled in the art will appreciate, however, that many variations from the embodiments are possible while remaining within the spirit and scope of the claims.

We claim:

1. A method comprising:
receiving into a radio access network (RAN) wirelessly from a mobile station registered with the RAN a de-registration message seeking to de-register the mobile station from the RAN; and
sending from the RAN wirelessly to the mobile station, in response to the de-registration message, a de-registration response message;
determining a communication address that the mobile station can contact when the mobile station has de-registered from the RAN and is thus not registered with the RAN;
using by the RAN the de-registration response message to communicate to the mobile station the determined communication address so that the mobile station can contact the communication address after the mobile station has de-registered from the RAN and is thus not registered with the RAN,
wherein the RAN uses the de-registration response message to communicate to the mobile station the determined communication address by carrying out a function selected from the group consisting of (i) specifying the determined communication address in the de-registration response message, to provide the communication address to the mobile station in the de-registration response message and (ii) providing in the de-registration response message a directive for the mobile station to retrieve the determined communication address from a particular network address.

2. The method of claim 1, wherein the communication address is selected from the group consisting of an E.164 telephone number and a Session Initiation Protocol (SIP) address.

3. The method of claim 1, wherein the communication address is a communication address of a public safety answering point (PSAP).

4. The method of claim 3, further comprising:
determining a location of the mobile station; and
using the determined location as a basis to determine the communication address to communicate to the mobile station.

5. The method of claim 4, wherein using the determined location as a basis to determine the communication address to communicate to the mobile station comprises:
referring to data that maps PSAP telephone numbers to locations, to determine from the data a PSAP communication address corresponding with the determined location of the mobile station.

6. The method of claim 4, further comprising:
receiving, in the de-registration message from the mobile station, an indication of the location of the mobile station, wherein determining the location of the mobile station comprises reading the indication from the de-registration message.

7. The method of claim 4, wherein the location of the mobile station is a geographic location of the mobile station.

8. The method of claim 4, wherein the location of the mobile station is a location of a base station or base station coverage area serving the mobile station while the mobile station is registered with the RAN.

9. A system comprising:
a radio access network (RAN) having a base station arranged to engage in wireless communication with a mobile station, wherein the base station wirelessly receives from the mobile station a de-registration message seeking to de-register the mobile station from the RAN and wirelessly sends to the mobile station, in response to the de-registration message, a de-registration response message;
a processing unit arranged to determine a communication address that the mobile station can contact when the mobile station has de-registered from the RAN and is thus not registered with the RAN,
wherein the base station is arranged to use the de-registration response message to communicate to the mobile station the determined communication address so that the mobile station can contact the communication address after the mobile station has de-registered from the RAN and is thus not registered with the RAN,
wherein the base station is arranged to use the de-registration response message to communicate to the mobile station the determined communication address by carrying out a function selected from the group consisting of (i) specifying the determined communication address in the de-registration response message, to provide the communication address to the mobile station in the de-registration response message and (ii) providing in the de-registration response message a directive for the mobile station to retrieve the determined communication address from a particular network address.

10. The RAN of claim 9, wherein the communication address is selected from the group consisting of an E.164 telephone number and a Session Initiation Protocol (SIP) address.

11. The RAN of claim 9, wherein the processing unit is part of the base station.

12. The RAN of claim 9, wherein the processing unit is communicatively linked with the base station.

13. The RAN of claim 9, wherein the processing unit is arranged to carry out at least the following functions so as to determine the communication address:
determining a location of the mobile station; and
determining the communication address based on the determined location of the mobile station.

14. The RAN of claim 13, wherein the communication address is a communication address of a Public Safety Answering Point (PSAP), and wherein determining the communication address based on the determined location of the mobile station comprises:

referring to data that maps PSAP communication addresses with locations, to determine from the data a PSAP communication address corresponding with the determined location of the mobile station.

15. The RAN of claim 13, wherein the de-registration message from the mobile station carries an indication of the location of the mobile station, and wherein determining the location of the mobile station comprises reading the indication from the de-registration message.

16. The RAN of claim 13, wherein the location of the mobile station is a geographic location of the mobile station.

17. The RAN of claim 13, wherein the location of the mobile station is a location of a base station or base station coverage area serving the mobile station while the mobile station is registered with the RAN.

18. A mobile station comprising:
a first wireless communication interface arranged to engage in wireless communication with a cellular radio access network (RAN);
a second wireless communication interface arranged to engage in wireless communication with a wireless local area network (WLAN);
data storage; and
a user interface,
wherein when the mobile station is registered with the RAN and seeks to de-register from the RAN, the mobile station uses the first wireless communication interface to transmit to the RAN a de-registration message and to receive from the RAN, in response to the de-registration message, a de-registration response message,
wherein the de-registration response message contains a communication address of a public safety answering point (PSAP),
wherein the mobile station obtains the communication address from the de-registration response message and stores the obtained communication address in the data storage for later reference, and
wherein when the mobile station is not registered with the RAN and seeks to place a PSAP call as a result of input received at the user-interface, the mobile station retrieves the stored communication address from the data storage and uses the second wireless communication interface to place a call via the WLAN to the retrieved communication address.

19. The mobile station of claim 18, wherein the communication address is structured as a Session Initiation Protocol (SIP) address, and wherein using the second wireless communication interface to place the call via the WLAN to the retrieved telephone number comprises sending via the second wireless communication interface a SIP INVITE seeking setup of a call to the SIP address.

20. The mobile station of claim of claim 18, wherein the first wireless communication interface and second wireless communication interface are integrated together.

* * * * *